US008463526B2

(12) United States Patent
Bauer

(10) Patent No.: US 8,463,526 B2
(45) Date of Patent: Jun. 11, 2013

(54) METHOD FOR DETECTING A PERIODICALLY PULSING OPERATING PARAMETER

(75) Inventor: Stefan Bauer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 12/741,174

(22) PCT Filed: Dec. 18, 2008

(86) PCT No.: PCT/EP2008/067886
§ 371 (c)(1),
(2), (4) Date: May 3, 2010

(87) PCT Pub. No.: WO2009/083475
PCT Pub. Date: Jul. 9, 2009

(65) Prior Publication Data
US 2010/0268437 A1    Oct. 21, 2010

(30) Foreign Application Priority Data

Dec. 28, 2007   (DE) .......................... 10 2007 063 102

(51) Int. Cl.
*F02D 41/18* (2006.01)
(52) U.S. Cl.
USPC ....................................... 701/103; 73/114.31
(58) Field of Classification Search
USPC .................. 701/102, 103; 73/114.31, 114.32, 73/114.37
See application file for complete search history.

(56) References Cited

U.S. PATENT DOCUMENTS

| 4,683,195 | A |   | 7/1987 | Mullis et al. ...................... 435/6 |
| 4,683,202 | A |   | 7/1987 | Mullis ............................. 435/91 |
| 4,800,159 | A |   | 1/1989 | Mullis et al. ............... 435/172.3 |
| 4,860,222 | A |   | 8/1989 | Schmidt et al. |
| 5,000,039 | A | * | 3/1991 | Wright et al. .............. 73/114.32 |
| 5,010,183 | A |   | 4/1991 | Macfarlane .................... 536/27 |
| 5,092,164 | A | * | 3/1992 | Matsuoka et al. ......... 73/114.34 |

(Continued)

FOREIGN PATENT DOCUMENTS

DE    39 02 168    8/1989
DE    39 05 735    8/1990

(Continued)

OTHER PUBLICATIONS

Baverud, V. et al.; "*Clostridium difficile*: prevalence in horses and environment, and antimicrobial susceptibility"; Equine Veterinary Journal; 35(5); (2003) pp. 465-471.

(Continued)

*Primary Examiner* — Hai Huynh
(74) *Attorney, Agent, or Firm* — Michael J. Striker

(57) ABSTRACT

In a method for detecting a periodically pulsing operating parameter of an internal combustion engine (10), a measured quantity of the periodically pulsing operating parameter of the internal combustion engine (10) is detected in order to generate a periodically pulsing measurement signal. The measurement signal in the time range having a fixed time increment is discretized, and so, in each case, a number of discrete measured values is obtained for one period of the measurement signal that corresponds to the number of time increments in the period. A mean value over the period of the measurement signal is determined by calculating a mean of the discrete measured values. For at least one of the discrete measured values, an approximation of the course of the measurement signal over the assigned time increment is carried out using a polynomial.

10 Claims, 3 Drawing Sheets

U.S. PATENT DOCUMENTS

| | | | |
|---|---|---|---|
| 5,186,045 A * | 2/1993 | Matsuoka et al. | 73/114.34 |
| 5,539,082 A | 7/1996 | Nielsen et al. | 530/300 |
| 5,620,852 A | 4/1997 | Lin et al. | 435/6 |
| 6,326,145 B1 | 12/2001 | Whitcombe et al. | 435/6 |
| 6,381,548 B1 | 4/2002 | Van Marion et al. | |
| 6,556,929 B1 | 4/2003 | Kleinhans et al. | |
| 6,627,159 B1 | 9/2003 | Bedingham et al. | 422/100 |
| 6,720,187 B2 | 4/2004 | Bedingham et al. | 436/45 |
| 6,734,401 B2 | 5/2004 | Bedingham et al. | 219/388 |
| 6,814,935 B2 | 11/2004 | Harms et al. | 422/99 |
| 6,987,253 B2 | 1/2006 | Bedingham et al. | 219/752 |
| 7,026,168 B2 | 4/2006 | Bedingham et al. | 436/174 |
| 7,164,107 B2 | 1/2007 | Bedingham et al. | 219/752 |
| 7,192,560 B2 | 3/2007 | Parthasarathy et al. | 422/101 |
| 2002/0047003 A1 | 4/2002 | Bedingham et al. | 219/388 |

FOREIGN PATENT DOCUMENTS

| | | |
|---|---|---|
| DE | 198 14 972 | 10/1999 |
| DE | 199 33 665 | 1/2001 |
| DE | 103 08 000 | 9/2004 |
| GB | 2 103 367 | 2/1983 |
| JP | 55-141618 | * 11/1980 |
| JP | 57-12321 | * 1/1982 |
| WO | WO 97/46707 | 12/1997 |
| WO | WO 97/46712 | 12/1997 |
| WO | WO 97/46714 | 12/1997 |
| WO | WO 01/37291 | 5/2001 |
| WO | 2005/052345 | 6/2005 |
| WO | WO 2008/134470 | 11/2008 |

OTHER PUBLICATIONS

Belanger, S.D. et al.; "C-476. One Hour Detection of Toxigenic *Clostridium difficile* Directly from Feces by Real-time PCR Using the Smart Cycler®"; Abstracts for the General Meeting of the American Society for Microbiology; vol. 101, 2001; pp. 261-262 (XP008100711).

Borriello, S.P. et al.; "Household pets as a potential reservoir for *Clostridium difficile* infection"; J. Clin. Pathol; 36; (1983) pp. 84-87.

Bourgault, A. et al.; "In Vitro Susceptibility of *Clostridium difficile* Clinical Isolates from a Multi-Institutional Outbreak in Southern Québec, Canada"; Antimicrobial Agents and Chemotherapy; vol. 50, No. 10; Oct. 2006 pp. 3473-3475.

Boyanton, B. L. et al.; "C-244, Rapid Stool-Based Detection of Pediatric *Clostridium difficile* Infections in Real-Time PCR"; Abstracts of the General Meeting of the American Society for Microbiology; vol. 107, 2007; p. 188 XP008100712.

Cardullo, R.A. et al.; "Detection of nucleic acid hybridization by nonradiative fluorescence resonance energy transfer"; Proc. Natl. Acad. Sci.; vol. 85, (1988) pp. 8790-8794.

Delmée, M.; "Laboratory diagnosis of *Clostridium difficile* disease"; Clinical Microbiology and Infection; vol. 7, No. 8, Aug. 2001; pp. 411-416.

Drudy, D. et al.; "Toxin A-negative, toxin B-positive *Clostridium difficile*"; International Journal of Infectious Diseases; vol. 11, No. 1; (2007) pp. 5-10 (XP002511017).

Egholm, M. et al.; "PNA hybridizes to complementary oligonucleotides obeying the Watson-Crick hydrogen-bonding rules"; Nature; vol. 365; Oct. 7, 1993 pp. 566-568.

Emori, T. et al.; "An Overview of Nosocomial Infections, Including the Role of the Microbiology Laboratory"; Clinical Microbiology Reviews; vol. 6, No. 4; Oct. 1993 pp. 428-442.

Glazer, A.N. et al.; "Energy-trnasfer fluorescent reagents for DNA analyses"; Current Opinion in Biotechnology; vol. 8; (1997); pp. 94-102.

Guilbault, C. et al.; "Development and Evaulation of a PCR Method for Detection of the *Clostridium difficile* Toxin B Gene in Stool Specimens"; Journal of Clinical Microbiology; vol. 40, No. 6; Jun. 2002; pp. 2288-2290.

Holland, P.M. et al.; "Detection of specific polymerase chain reaction product by utilizing the 5' → 3' exonuclease activity of *Thermus aquaticus* DNA polymerase" Proc. Natl. Acad. Sci.; vol. 88; Aug. 1991; pp. 7276-7280.

Johansson, M.K. et al.; "Intramolecular Dimers: A New Strategy to Fluorescence Quenching in Dual-Labeled Oligonucleotide Probes"; J. Am. Chem. Soc.; vol. 124, No. 24 (2002) pp. 6950-6956.

Lemee, L. et al.; Multiplex PCR Targeting *tpi* (Triose Phosphate Isomerase), *tcdA* (Toxin A), and *tcdB* (Toxin B) Genes for Toxigenic Culture of *Clostridium difficile*; Journal of Clinical Microbiology; vol. 42, No. 12; Dec. 2004; pp. 5710-5714.

Letourneur, O. et al.; "Molecular cloning, overexpression in *Escherichia coli*, and purification of 6 X his-tagged C-terminal domain of *Clostridium difficile* toxins A and B"; Protein Expression and Purification; vol. 31, No. 2; (2003) pp. 276-285.

Livak, K.J. et al.; "Oligonucleotides with Fluorescent Dyes at Opposite Ends Provide a Quenched Probe System Useful for Detecting PCR Product and Nucleic Acid Hybridization"; PCR Methods and Applications; vol. 4; (1995); pp. 357-362.

Lozniewski, A. et al.; "Laboratory Diagnosis of *Clostridium difficile*-Associated Diarrhea and Colitis: Usefulness of Premier Cytoclone A+B Enzyme Immunoassay for Combined Detection of Stool Toxins and Toxigenic *C. difficile* Strains"; Journal of Clinical Microbiology; vol. 39, No. 5; May 2001; pp. 1996-1998.

Mathis, J.N. et al.; "Detection and Transcription of Toxin DNA in a Nontoxigenic Strain of *Clostridium difficile*"; Current Microbiology; vol. 38, No. 6; (1999) pp. 324-238 (XP002511019).

Nazarenko, I.A. et al.; "A closed tube format for amplification and detection of DNA based on energy transfer"; Nucleic Acids Research; vol. 25, No. 12; (1997) pp. 2516-2521.

Palladino, S. et al.; "Real-time PCR for the rapid detection of *vanA* and *vanB* genes"; Diagnostic Microbiology and Infectious Disease; vol. 45 (2003) pp. 81-84.

Pituch, H. et al.; "Laboratory diagnosis of antibiotic-associated diarrhea: a Polish pilot study into the clinical relevance of *Clostridium difficile* and *Clostridium perfringens* toxins"; Diagnostic Microbiology and Infectious Disease; vol. 58, No. 1, (2007); pp. 71-75.

Sambol, S.P. et al.; "Toxin Gene Analysis of a Variant Strain of *Clostridium difficile* That Causes Human Clinical Disease"; Infection and Immunity; vol. 68, No. 10; (2000) pp. 5480-5487 (XP002511018).

Sambrook, J. et al.; "Molecular Cloning—A Laboratory Manual" Second Edition (1989) 15 pgs of contents.

Svanvik, N. et al.; "Detection of PCR Products in Real Time Using Light-up Probes"; Analytical Biochemistry; vol. 287; (2000); pp. 179-182.

Tatusova, T.A. et al.; "BLAST 2 Sequences, a new tool for comparing protein and nucleotide sequences"; FEMS Microbiology Letters; vol. 174 (1999) pp. 247-250.

Tyagi, S. et al.; "Molecular Beacons: Probes that Fluoresce upon Hybridization"; Nature Biotechnology; vol. 14; (1996) pp. 303-308.

Tyagi, S. et al.; "Multicolor molecular beacons for allele discrimination"; Nature Biotechnology; vol. 16; (1998) pp. 49-53.

Van den Berg, R.J. et al.; "Evaluation of real-time PCR and conventional diagnostic methods for the detection of *Clostridium difficile*-associated diarrhoea in a prospective multicentre study"; Journal of Medical Microbiology; vol. 56; (2007) pp. 36-42 (XP002511016).

Wallace, R.B. et al.; "Hybridization of synthetic oligodeoxyribonucleotides to ΦX 174 DNA: the effect of single base pair mismatch"; Nucleic Acids Research; vol. 6, No. 11; (1979) pp. 3543-3557.

Whitcombe, D. et al.; "Detction of PCR products using self-probing amplicons and fluorescence"; Nature Biotechnology; vol. 17; (1999) pp. 804-817.

Wittwer, C.T. et al.; "Continuous Fluorescence Monitoring of Rapid Cycle DNA Amplification"; BioTechniques; vol. 22, No. 1 (1997); pp. 130-131 and 134-138.

Wroblewski, D. et al.; "C-345. Diagnosis and Characterization of *Clostridium difficile* Using Multiplex Real-Time PCR and Sequence Analysis"; Abstracts of the General Meeting of the American Society for Microbiology; vol. 107; (2007) p. 211 (XP008100719).

* cited by examiner

METHOD FOR DETECTING A PERIODICALLY PULSING OPERATING PARAMETER

CROSS-REFERENCE

The invention described and claimed hereinbelow is also described in PCT/EP2008/067886, filed on Dec. 18, 2008 and DE 10 2007 063 102.4, filed on Dec. 28, 2007. This German Patent Application, whose subject matter is incorporated here by reference, provides the basis for a claim of priority of invention under 35 U.S.C. 119 (a)-(d).

BACKGROUND INFORMATION

The present invention relates to a method for detecting a periodically pulsing operating parameter of an internal combustion engine, which includes the steps: detect a measured quantity of the periodically pulsing operating parameter of the internal combustion engine, in order to generate a periodically pulsing measurement signal, discretize the measurement signal in the time range having a fixed time increment, and so, in each case, a number of discrete measured values is obtained for one period of the measurement signal that corresponds to the number of time increments in the period, each measured value being considered representative of the measurement signal in the particular time increment, and determine a mean over the period of the measurement signal by calculating a mean of the discrete measured values. Furthermore, the present invention relates to a device that is designed to implement a method of this type, and to a computer program for executing all steps of a method of this type.

During operation of internal combustion engines, it is necessary to detect various operating parameters, some of which pulse periodically. For instance, it is necessary to detect the air mass flow that is directed into the combustion chambers of the internal combustion engine; this air mass flow pulses due to the discontinuous operation of a piston-type internal combustion engine. Air is drawn in only when one of the intake valves of the internal combustion engine is open. Nevertheless, the air mass flow must be determined as exactly as possible in order to ensure economical and low-emission operation of the internal combustion engine. The operation of a sensor for the determination of air mass flow is described in DE 199 33 665 A1. Further pulsing operating parameters of an internal combustion engine are, e.g., the pressure in a high pressure fuel accumulator or the angular velocity of the crankshaft of the internal combustion engine.

In conventional methods for evaluating a periodically pulsing measurement signal, the measurement signal is detected and discretized using a time frame. In that case, a discrete measured value is assigned to a particular subsequent time increment of the time frame that corresponds to the measured value at the beginning of the time increment. Means of the measured values are then calculated for the two half-waves of a period, with all measured values being weighted equally. Finally, these two means of the particular half-waves of the period are averaged, in order to obtain an overall result.

In the method described in the prior art, an error occurs if, at the beginning of the period or at the end of the period, the boundary of the particular time increment does not coincide with the boundary of the period. This is disadvantageous since it results in an inexact determination of the air mass flow, and so fuel may be metered incorrectly in some circumstances. This may result in unwanted exhaust emissions and uneconomical operation of the internal combustion engine. It is likewise problematic if the pressure in a high pressure fuel accumulator is determined incorrectly since, if an incorrect pressure value is applied, the quantities of fuel that are injected by the injection valves into the combustion chambers differ from the demanded setpoint fuel quantities.

SUMMARY OF THE INVENTION

An object of the present invention is to improve the devices and methods known from the prior art, and, in particular, to provide a method and a device that make it possible to better calculate the mean of detected pulsing operating parameters of an internal combustion engine.

This problem is solved via a method for detecting a periodically pulsing operating parameter of an internal combustion engine, which includes the steps: detect a measured quantity of the periodically pulsing operating parameter of the internal combustion engine, in order to generate a periodically pulsing measurement signal, discretize the measurement signal in the time range having a fixed time increment, and so, in each case, a number of discrete measured values is obtained for one period of the measurement signal that corresponds to the number of time increments in the period, each measured value being considered representative of the measurement signal in the particular time increment, and determine a mean over the period of the measurement signal by calculating a mean of the discrete measured values; for at least one of the discrete measured values, an approximation of the course of the measurement signal over the assigned time increment is carried out using a polynomial in order to obtain the discrete measured value. The discretization of the measurement signal in the time range is carried out, e.g., in that, in a new time increment, discretization is started by sampling the measurement signal at the beginning of this time increment and storing it as the first measured value, and then detecting further measured values at the beginning of each subsequent time increment by sampling the measurement signal; the detection of measured values is halted after one period has been covered. In the case of a measurement signal that pulses in a substantially sinusoidal manner, the completion of one period may be detected by the fact that the measurement signal passes over the measured value that was detected at the beginning of the first time increment a first time with a slope that has the same direction as it did when the first measurement value was recorded at the beginning of the period. Other possibilities for detecting the beginning of a period and the end of a period are also feasible, e.g., for a measured value that is close to the mean, an estimated mean is passed over a second time after a beginning. The estimated mean may be obtained from previous calculations. The time increments are fixed time increments; in the case of an internal combustion engine, a fixed time increment may also be understood to be a certain angular progression of the crankshaft. However, a fixed time increment is preferred that has a value between 0.1 ms and 10 ms, and preferably between 0.5 ms and 3 ms. According to the present invention, an approximation of the course of the measurement signal is carried out over the assigned time increment using a polynomial, for at least one of the discrete measured values. This provides the advantage that, in the case of a time increment that lies at the beginning or at the end of a period, the assigned measured value may be obtained from the continuous curve of the polynomial; it is possible to account for the fact that a time increment located on the edge does not lie entirely within the period. This provides the advantage of improving the approximation in calculating the mean of the periodically pulsing operating parameter.

The polynomial is preferably of at least the first degree. It should be taken into account that, in this application, a polynomial in the general sense is understood to be a polynomial of at least the first degree. When a polynomial of the zeroth degree is noted, this is expressly mentioned. The polynomial may also be of the second or third degree, or of a higher degree. A polynomial of the first degree offers the advantage that only minimal computing power is utilized. The polynomial is created by using the value that is sampled at the beginning of a time increment and the value that is sampled at the end of the time increment, in order to form a line between them, as the approximation.

The approximation of the course is preferably carried out by applying the polynomial to one of the discrete measured values, the assigned time increment of which extends beyond a boundary of the period. An error may occur in the determination of the mean if a measured value of a time increment is obtained that extends beyond the boundary of a period. This is typically the last time increment since, in typical methods, the period under consideration starts at the beginning of a time increment. Since a period typically does not have a period length that is a multiple of the duration of the time increment, a time increment is "cut off" at the end of the period. As a result, pronounced rounding errors may occur in the subsequent calculation of the mean if the measured value that was obtained via discretization and is assigned to this time increment is used to calculate the mean without it being given further consideration.

In calculating the mean, the measured value having an assigned time increment that extends beyond the boundary of the period is preferably weighted using a smaller percentage than at least one of the other measured values that is used to calculate the mean. Since the discrete measured value that is assigned to a time increment that does not lie entirely within the period is only representative of a smaller portion of the period than one of the other measured values, the assigned time increments of which lie entirely within the period, an approximation of this type improves the calculation of the mean. The time increment that lies beyond the boundary of the period is usually the time increment that lies at the end of the period and extends beyond the end of the period.

In determining the measured value having an assigned time increment that extends beyond the boundary of the period, an approximate value for the measurement signal is preferably determined at the boundary of the period with the aid of the polynomial, and is used to determine the measured value. The time increment that lies beyond the boundary of the period begins before the boundary of the period and ends after the boundary of the period. The measurement signal may be sampled at each of these two ends of the time increment, and the course of the signal between them may be approximated using the polynomial. Since the point in time of the boundary of the period is known, an approximate value for the measurement signal at the boundary of the period may be obtained from this course which is determined via approximation using the polynomial. Taking this approximate value into account, e.g., by calculating the mean and using the measurement signal that was sampled at the beginning of the time increment improves the accuracy of the measured value that is assigned to this time increment. The overall accuracy of the method is improved as a result.

Preferably, a value of the measurement signal at the edge of the time increment is used as the discrete measured value for one of the measured values that has an assigned time increment within the period. For example, the measurement signal may be sampled at the beginning of the time increment, and this sampled value may be used as the measured value. Likewise, the measurement signal may be sampled at the end of the time increment, in order to obtain the measured value. In this case, "lying within the period" means that the time increment does not extend beyond a boundary of the period. This feature has the advantage that no computing power, or only very little computing power is required to determine the measured value for the time increments that lie within the period. This form of detecting a discrete measured value may also be understood as an approximation using a polynomial of the zeroth degree.

The pulsing operating parameter is preferably an air mass flow or a pressure. The air mass flow may be measured, e.g., using a hot film sensor (HFM sensor). The pressure in a high pressure accumulator of the internal combustion engine may be measured using a pressure sensor that is located on the high pressure accumulator.

Advantageously, all time increments that lie entirely or partially within the period are assigned to the period. The beginning of a period is preferably placed at the beginning of a time increment. In so doing, it is not possible to perform determinations of the mean in direct succession in every case since a time increment may be "cut off" at the end of the period. Nevertheless, this feature has the advantage that the mean of the period may be calculated very exactly and in a reliable manner.

A further aspect of the present invention relates to a device, in particular an electronic control device or an internal combustion engine that is designed to implement a method according to one of the embodiments described above. Devices according to the present invention make use of one or more of the above-described, preferred features, if necessary.

A further aspect of the present invention relates to a computer program having a program code to carry out all steps of a method according to the present invention when the program is run on a computer.

BRIEF DESCRIPTION OF THE DRAWINGS

At least one embodiment of the present invention is explained below in greater detail with reference to the attached drawings. In the drawings.

DETAILED DESCRIPTION OF THE PREFERRED EMBODIMENTS OF THE INVENTION

Figure 1:
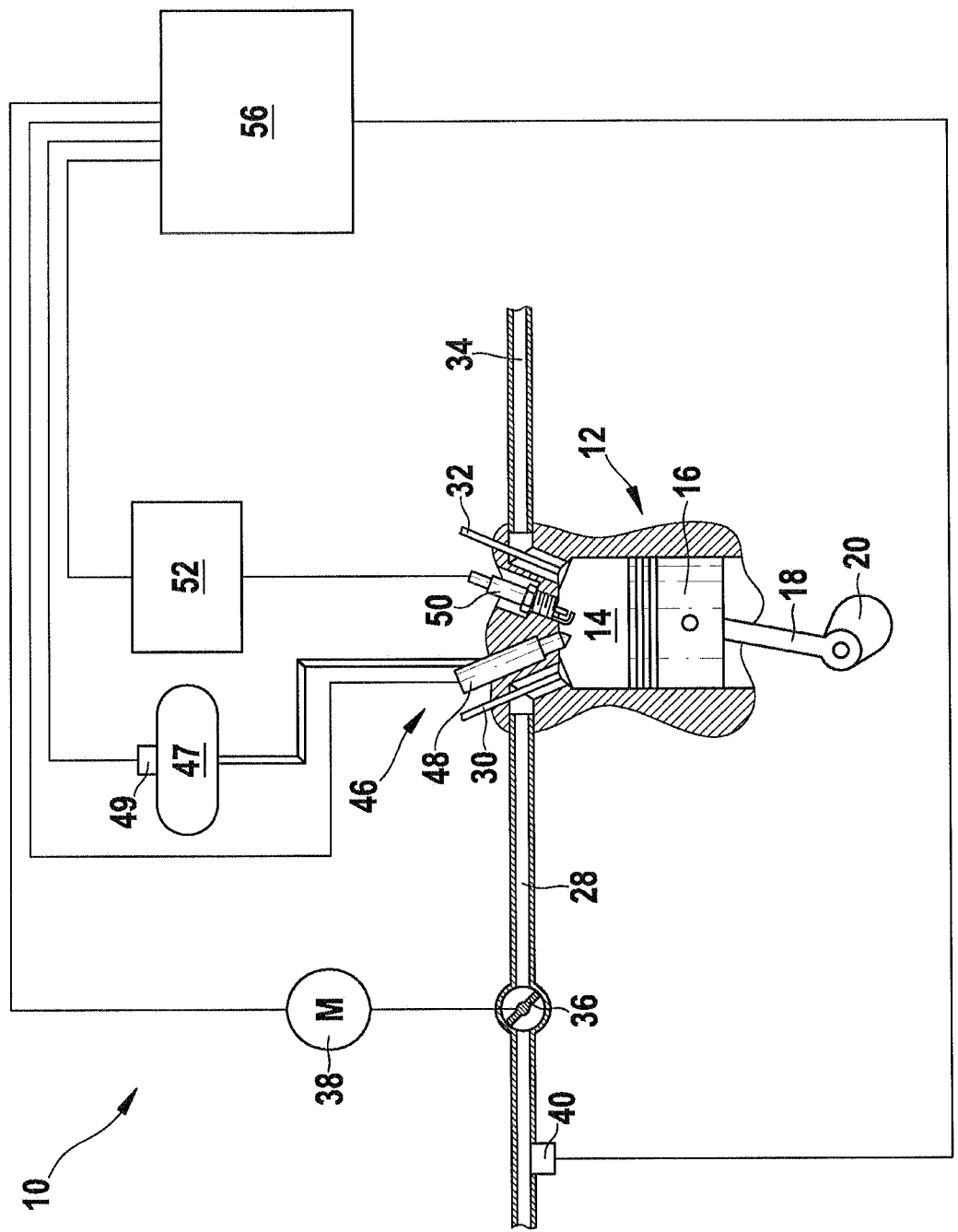
FIG. 1 shows a schematic depiction of an internal combustion engine, using which a method according to the present invention may be implemented.

FIG. 1 shows a schematic depiction of an internal combustion engine 10 which includes an engine block having a plurality of cylinders 12, only one of which is shown in FIG. 1. A combustion chamber 14 that is limited within a range by a piston 16 is present in cylinder 12. Piston 16 is connected via a connecting rod 18 to a crankshaft 20.

Combustion air is supplied to combustion chamber 14 through an inlet pipe 28 and an intake valve 30. The combustion exhaust gasses are removed from combustion chamber 14 via an exhaust valve 32 and an exhaust pipe 34. A throttle valve 36 makes it possible to adjust the air quantity that reaches combustion chamber 14 via inlet pipe 28. Throttle valve 36 is moved via a servomotor 38. The quantity of air that reaches combustion chamber 14 is measured by a hot film sensor 40 ("HFM sensor").

Fuel is supplied to combustion chamber 14 via a fuel system 46 that is depicted symbolically in FIG. 1. A fuel system 46 of this type may include a fuel tank, an electrical presupply pump, and a mechanical main supply pump. Fuel system 46 also includes a common fuel line, which is referred to as a rail or high pressure accumulator 47, in which fuel is stored under high pressure. An injection valve 48 is connected to the common fuel line, which injects fuel directly into combustion chamber 14 of internal combustion engine 10. A pressure sensor 49, which measures the pressure in high pressure accumulator 47, is located on high pressure accumulator 47. It is used to activate a valve of a high pressure pump (not depicted) via closed-loop control in order to maintain a substantially constant pressure in high pressure accumulator 47. The air-fuel mixture that is present in combustion chamber 14 is ignited by a spark plug 50 which is supplied with the necessary energy by an ignition system 52.

The operation of internal combustion engine 10 is subject to open-loop and closed-loop control by an electronic control unit 56 which is connected, on the output side, to ignition system 52, injection valve 48, and servomotor 38 of throttle valve 36, and on the input side, electronic control unit 56 is connected to hot film sensor 40 and pressure sensor 49, and to other sensors.

As shown in FIG. 1, fuel is injected directly into combustion chamber 14 by injection valve 48. Internal combustion engine 10 may be operated in different operating modes, depending, e.g., on the speed and torque. It is possible, for instance, to inject fuel into combustion chamber 14 during the intake stroke, that is, during a period of time in which intake valve 30 is open. In this case, the fuel and air that are present in combustion chamber 14 form a substantially homogeneous fuel-air mixture. Injection of this type is referred to as "homogeneous injection", and the corresponding operating mode is referred to as "homogeneous".

However, it is also possible to inject fuel during the compression phase, that is, when intake valve 30 and exhaust valve 32 are closed, and shortly before piston 16 reaches top dead center. Due to the special design of injection valve 48, an ignitable fuel layer is present only in the direct vicinity of spark plug 50, while very little or no fuel is present in the rest of combustion chamber 14 of cylinder 12. Injection of this type is referred to as "stratified-charge injection", and the corresponding operating mode is referred to as "stratified-charge operation". Any combination of the two operating modes is possible.

Exact knowledge of the air mass flow in the induction tract is required for all of the above-described operating modes. Inlet pipe 28 is part of the induction tract; due to the absence of branches, the air mass flow through inlet pipe 28 to combustion chamber 14 is equal to the air mass flow that is detected by hot film sensor 40.

Figure 2:
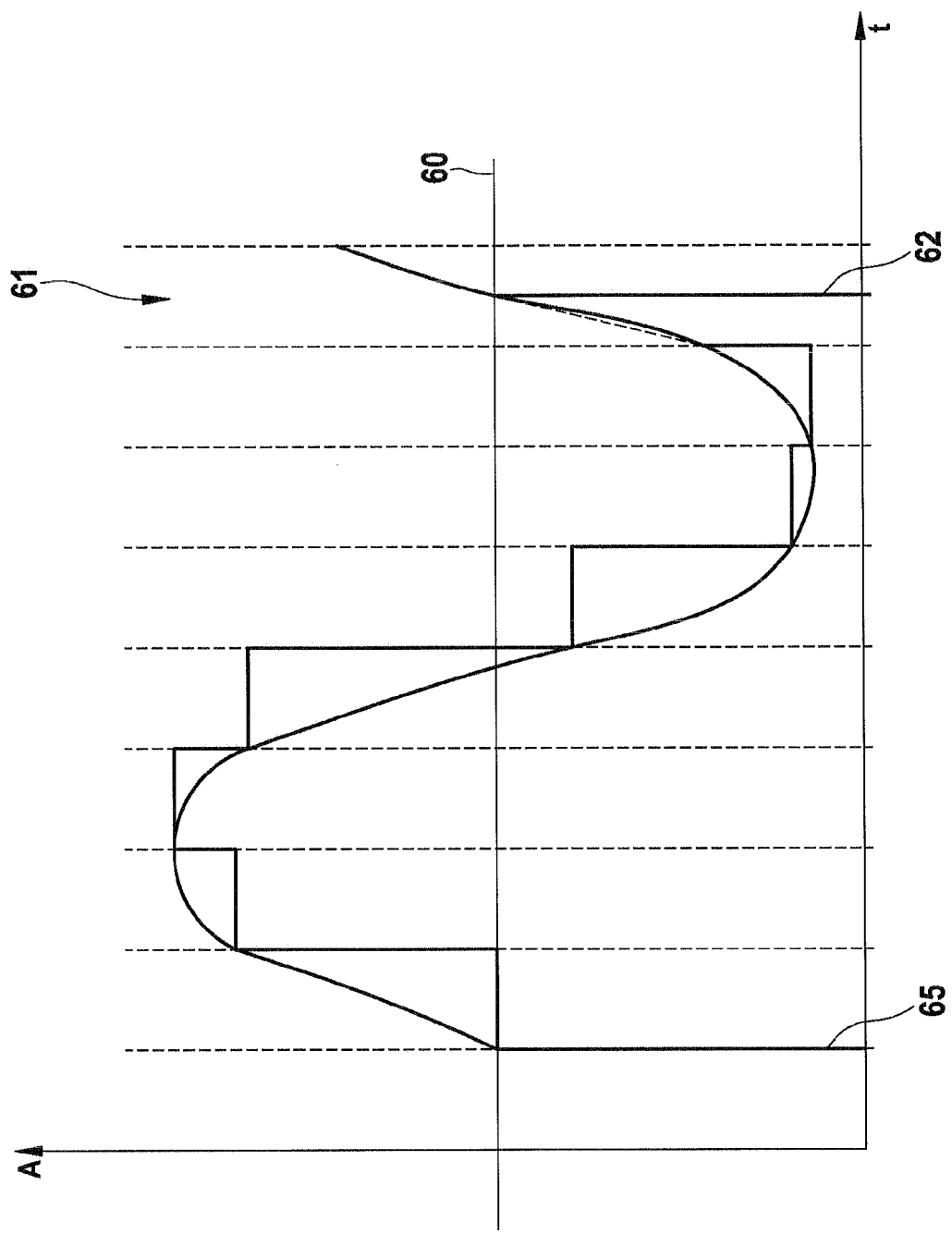
FIG. 2 shows a schematic illustration of the method according to the present invention with reference to an averaging of a pulsing signal.

The use of a method according to the present invention to calculate the mean of a pulsing signal is shown in FIG. 2. Reference is made to the system in FIG. 1 and the related description of FIG. 1.

Hot film sensor 40 detects the air mass flow in the induction tract of internal combustion engine 10. Due to the operation of intake valve 30, the air mass flow pulses in the induction tract. Likewise, as a result, a pulsing signal is generated by hot film sensor 30, and it is transmitted to electronic control unit 56. The graph of this signal is depicted, in a sectional view and as an example, in FIG. 2; time is plotted on the longitudinal axis of the diagram, and signal amplitude is plotted on the vertical axis of the diagram. Furthermore, a time frame is shown in FIG. 2, using which the pulsing signal is discretized. The time frame is depicted using vertical, thin, dashed lines, and the interval between two time frame lines is 1 ms. The method begins with the discretization of the pulsing signal immediately after an estimated mean 60 (the line labelled with reference numeral 60) is passed from below and toward the top, and a waiting period for the next fixed time frame ensues. In FIG. 2, the time frame and the passage of the pulsing signal through estimated mean 60 happen to coincide.

Next, the course of the pulsing signal is tracked, and a measurement point is set at every point of intersection of the signal course with the fixed time frame, i.e, at the beginning of every time increment. In calculating the mean, the measurement signal at the beginning of the time increment is used as the measured value for the entire time increment for each time increment, i.e., the time interval between two vertical dashed lines in the diagram shown in FIG. 2. As a result, the thick stepped curve shown in FIG. 2 is obtained; it represents the course of the signal that is initially approximated by the method. The area under the stepped curve is the assumed integral of the course of the pulsing signal. This procedure is continued until the course of the pulsing signal once again passes estimated mean 60 from below and toward the top. The last time increment is handled differently than the previous time increment, in order to calculate the approximation. In other embodiments of the present invention, all approximate values of all time increments are treated in the same manner as the last time increment, and as will be described below. The last time increment is labelled with reference numeral 61 in FIG. 2. Last time increment 61 extends beyond the boundary of a period of the pulsing signal.

A polynomial of the first degree is used to calculate the approximation of last time increment 61. This corresponds to a line between the measurement point at the beginning of time increment 61 to the measurement point at the end of time increment 61. These two measurement points are simply connected to one another. It is then possible to calculate an assumed passage of the signal course through estimated mean 60 using a rule of three. The assumed passage or intersection point is indicated on the time axis by a thick vertical line 62. In the method according to the present invention, a rectangular area is not used as the integral for last increment 61, but rather the quadrangle that is located within the last increment, and that is limited by a dotted-dashed line is used. This dotted-dashed line represents the first-degree polynomial between the two above-mentioned measurement points. Next, the range from the beginning of the detection of the period (labelled "65" on the time axis) to the calculated passage of estimated mean 60 that is integrated in this manner is divided by the time that lies between reference numerals 65 and 62, and therefore an approximation of the mean of the course of the pulsing signal is calculated.

In other embodiments of the present invention, an approximation using a first-degree polynomial is carried out not only for last increment 61, but also for all time increments. Under certain circumstances, this offers a further improvement of the mean calculation. In other embodiments of the present invention, higher-degree polynomials are used, e.g., second-degree polynomials, in order to approximate the course of the pulsing measurement signal. This results in greater accuracy, but also requires greater computing power.

Figure 3:
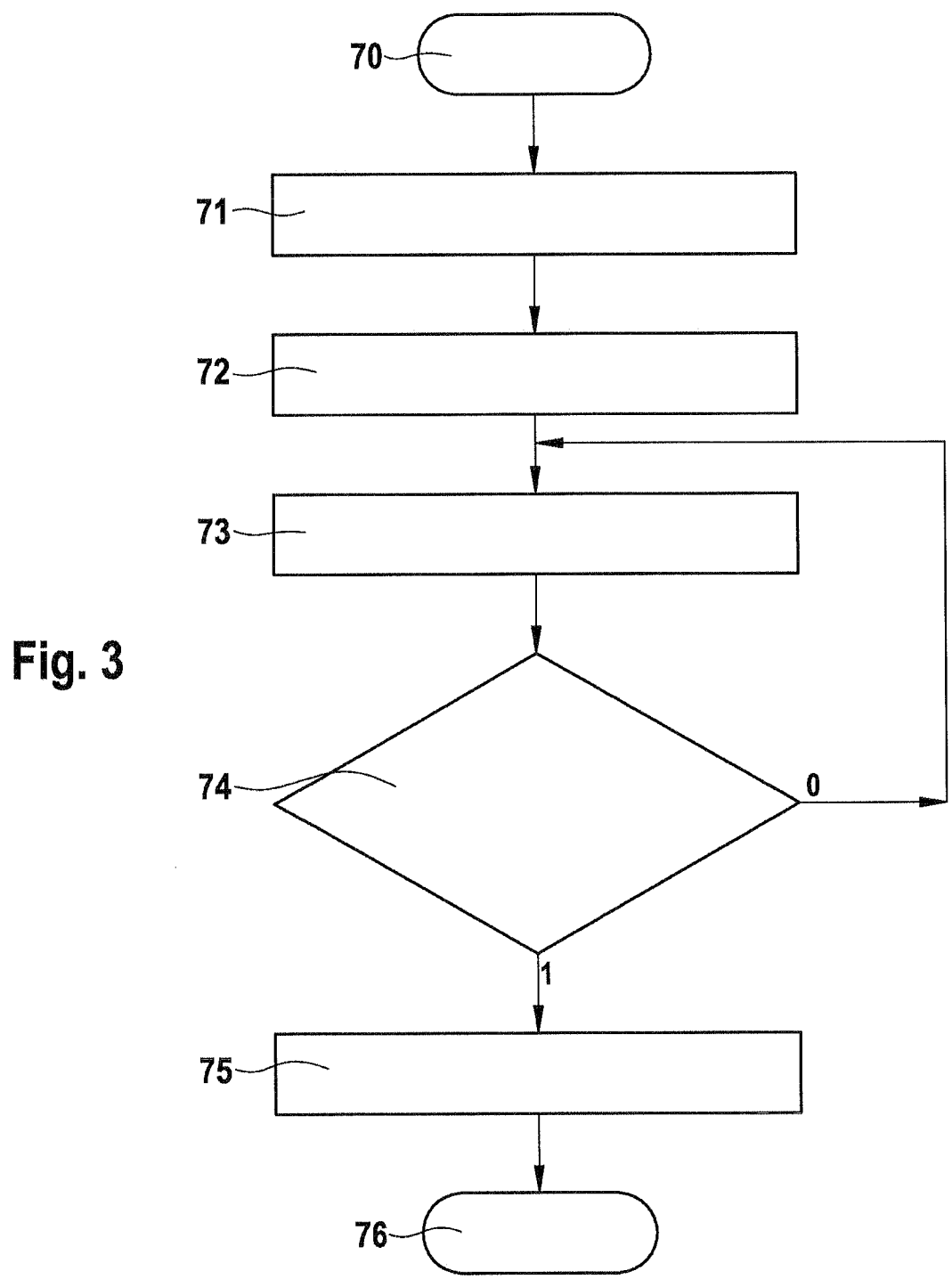
FIG. 3 shows a schematic depiction of the course of the method according to the present invention shown in FIG. 2, in the form of a diagram.

The steps involved in the method according to the present invention are illustrated in a diagram shown in FIG. 3. The method, according to the present invention, that is depicted in FIG. 3 corresponds to the method, according to the present invention, that is used in FIG. 2. The method starts with a step 70. Next, the method waits in a step 71 until an estimated mean, which is obtained, e.g., via a previous calculation, has been passed. In a step 72, the method waits until a next time increment begins. Once the next time increment begins, after the mean is passed from below and toward the top, the method starts to record the measurement points; the measurement point at the beginning of the first time increment is measured first (step 73). In a subsequent step 74, a check is carried out to determine whether the pulsing signal has passed the estimated mean once more, from below and toward the top. This may be detected, e.g., by comparing two consecutive values of the pulsing signal at the beginning and the end of a time increment. If the second value of the pulsing signal at the end of the time increment is greater than the first value at the beginning of the time increment, and if the second value is greater than the estimated mean, i.e., the value at which the detection of the period was started, and the first value of the pulsing signal at the beginning of the time increment is less than the estimated mean, then it may be assumed that the pulsing signal has passed the estimated mean once more, from below and toward the top. All of the conditions noted above must be met. If these conditions are not met, the method jumps from step 74 back to step 73, in which additional measured values are detected. However, if all conditions have been met and it may be assumed that the period has been traversed completely, the method jumps to a step 75. In step 75, the approximation calculation described in conjunction with FIG. 2 is carried out, and, in particular, the end of the period is approximately determined on the time axis by approximating the last time increment (FIG. 2) using a first-degree polynomial. Once the calculation has been completed, the result is output. The method ends in a step 76.

What is claimed is:

1. A method for detecting a periodically pulsing operating parameter of an internal combustion engine (10), comprising the steps:
    detect a measured quantity of the periodically pulsing operating parameter of the internal combustion engine (10) in order to generate a periodically pulsing measurement signal,
    discretize the measurement signal in the time range having a fixed time increment, and so, in each case, a number of discrete measured values is obtained for one period of the measurement signal that corresponds to the number of time increments in the period, each measured value being considered as representative of the measurement signal in the particular time increment, and
    determine a mean value over the period of the measurement signal by calculating a mean of the discrete measured values,
    wherein,
        for at least one of the discrete measured values, an approximation of the course of the measurement signal over the assigned time increment (61) is carried out using a polynomial in order to obtain the discrete measured value.

2. The method as recited in claim 1,
wherein
    the polynomial is of at least the first degree.

3. The method as recited in claim 1,
wherein
    the approximation of the course is carried out using the polynomial on one of the discrete measured values, the assigned time increment (61) of which extends beyond a boundary of the period.

4. The method as recited in claim 3,
wherein,
    in calculating the mean, the measured value having an assigned time increment (61) that extends beyond the boundary of the period is preferably weighted using a smaller percentage than at least one of the other measured values that is used to calculate the mean.

5. The method as recited in claim 3,
wherein,
    in determining the measured value having an assigned time increment (61) that extends beyond the boundary of the period, an approximate value for the measurement signal is determined at the boundary of the period with the aid of the polynomial, and is used to determine the measured value.

6. The method as recited in claim 1,
wherein
    a value of the measurement signal at the edge of the time increment is used as the discrete measured value for one of the measured values that has an assigned time increment within the period.

7. The method as recited in claim 1,
wherein
    the pulsing operating parameter is an air mass flow or a pressure.

8. The method as recited in claim 1,
wherein
    all time increments that lie entirely or partially within the period are assigned to the period.

9. A device, in particular an electronic control unit (56) or an internal combustion engine (10) that is designed to implement a method as recited in claim 1.

10. A computer program comprising a program code for executing all steps as recited in claim 1 when the program is run on a computer.

* * * * *